United States Patent [19]

Okazaki et al.

[11] Patent Number: 5,631,321
[45] Date of Patent: May 20, 1997

[54] SEALING COMPONENT FOR CONNECTOR WATERPROOFING

[75] Inventors: Kiyotaka Okazaki; Masahiro Kanda, both of Shizuoka, Japan

[73] Assignees: Yazaki Corporation; Shin-Etsu Chemical Co., Ltd., both of Tokyo, Japan

[21] Appl. No.: 510,075

[22] Filed: Aug. 1, 1995

[30] Foreign Application Priority Data

Aug. 2, 1994 [JP] Japan .................................. 6-181125

[51] Int. Cl.$^6$ .................................................. C08G 77/08
[52] U.S. Cl. .................................................. 524/862; 528/24
[58] Field of Search ................................. 528/24; 524/862

[56] References Cited

U.S. PATENT DOCUMENTS

| | | | |
|---|---|---|---|
| 4,061,704 | 12/1977 | Barter | 524/24 |
| 4,771,099 | 9/1988 | Itoh et al. | 524/862 |
| 5,051,465 | 9/1991 | Yoshino et al. | 528/24 |
| 5,294,373 | 3/1994 | Takahashi et al. | 252/502 |

FOREIGN PATENT DOCUMENTS

| | | | |
|---|---|---|---|
| 60-120755 | 6/1985 | Japan | C08L 83/04 |
| 61-21177 | 1/1986 | Japan | C09K 3/10 |
| 62-252457 | 11/1987 | Japan | C08L 83/07 |
| 63-309542 | 12/1988 | Japan | C08L 23/08 |

*Primary Examiner*—Ralph H. Dean
*Attorney, Agent, or Firm*—Sughrue, Mion, Zinn, Macpeak & Seas

[57] ABSTRACT

The present invention provides a sealing component for connector waterproofing having an excellent heat resistance, low-temperature resistance and oil resistance which can be economically produced in a reduced molding time. A novel sealing component for connector waterproofing is provided, which comprises a vulcanized composition comprising at least (a) 100 parts by weight of an organopolysiloxane represented by the following average composition formula (I), (b) from 5 to 500 parts by weight of a finely divided silica filler, (c) from 0.01 to 5 parts by weight of a dialkyl peroxide or peroxy ketal which has a half-life of 1 hour at a temperature of from 130° C. to 150° C., (d) from 0.1 to 5 parts by weight of a silicon compound having two or more Si—H bonds per molecule, and (e) from 0.01 to 2 parts by weight of an organic peroxide represented by the following general formula (II):

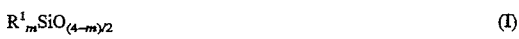

$$R^1{}_m SiO_{(4-m)/2} \qquad (I)$$

wherein $R^1$ represents a substituted or unsubstituted monovalent hydrocarbon group; and m represents a positive number of from 1.98 to 2.02;

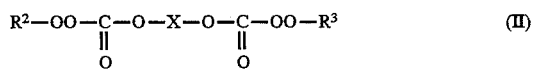

$$R^2-OO-\underset{\underset{O}{\|}}{C}-O-X-O-\underset{\underset{O}{\|}}{C}-OO-R^3 \qquad (II)$$

wherein X represents a $C_{2-8}$ unsubstituted divalent hydrocarbon group; and $R^2$ and $R^3$ may be the same or different and each represent a $C_{3-10}$ monovalent hydrocarbon group or a group represented by —$SiR^4{}_3$ (in which $R^4$ represents a methyl, ethyl or phenyl group).

8 Claims, 2 Drawing Sheets

SEALING COMPONENT FOR CONNECTOR WATERPROOFING

FIELD OF THE INVENTION

The present invention relates to a sealing component for connector waterproofing. More particularly, the present invention relates to a sealing component for connector waterproofing which can be easily mounted on a connector housing, can cause connector housings to be fitted into each other with a reduced resistance, can maintain a good waterproofness and can be obtained at a high productivity.

BACKGROUND OF THE INVENTION

Connectors for use in the connection of electrical circuits in automobile need to exhibit a high oil resistance as well as high waterproof sealing properties. Most sealing rubber parts to be mounted on these connectors, such as packing and rubber stopper, are made of oil-bleeding rubber material. In such a use, as molding materials there are used an oil-bleeding NBR obtained by blending a butadiene-acrylonitrile copolymer with an aliphatic hydrocarbon oil (JP-A-61-21177 (The term "JP-A" as used herein means an "unexamined published Japanese patent application")), oil-bleeding silicone rubber obtained by blending a silicone rubber with a silicone oil (JP-A-62-252457), oil-bleeding polyolefin rubber obtained by blending a polyolefinic rubber with an ester plasticizer (JP-A-63-309542), etc.

However, all these rubber materials have defects. For example, NBR materials are disadvantageous in that they are not heat-resistant enough to use in high temperature zones in automobile engine room, though being available at a low price and excellent in oil resistance. Silicone rubber materials are excellent in heat resistance, low-temperature resistance and oil resistance but are expensive and find difficulty in general-purpose properties. Further, polyolefinic materials have an insufficient oil resistance and thus are not suitable for use in automobile engine room.

Under these circumstances, it is impossible to reduce the price of the silicone rubber having relatively excellent properties while maintaining the excellent properties. Therefore, various approaches for reducing the molding time of rubber parts have been proposed to reduce the price of the rubber parts. A general millable silicone rubber composition comprises an organic peroxide as a vulcanizing agent and is thus advantageous in that the blend exhibits a good storage stability and a long pot life, and can be easily handled. On the contrary, this type of silicone rubber composition is disadvantageous in that it requires a prolonged vulcanizing time and thus cannot be molded in a reduced period of time.

On the other hand, a binary liquid silicone rubber composition which undergoes addition reaction for vulcanization in the presence of a platinum catalyst has been developed. The addition reaction type liquid silicone rubber composition requires a drastically reduced vulcanizing time and thus can be molded in a reduced period of time. However, this type of liquid silicone rubber composition is disadvantageous in that the mixture of two liquids must be immediately injected into the mold, requiring an additional molding apparatus and giving troublesome operation.

SUMMARY OF THE INVENTION

It is therefore an object of the present invention to provide a sealing component for connector waterproofing having an excellent heat resistance, low-temperature resistance and oil resistance which can be economically prepared in a reduced molding time by solving the problems with sealing components for connector waterproofing prepared from prior art rubber materials.

The foregoing object of the present invention will become more apparent from the following detailed description and examples.

The foregoing object of the present invention is accomplished with a sealing component for connector waterproofing, which comprises a vulcanized composition comprising at least (a) 100 parts by weight of an organopolysiloxane represented by the following average composition formula (I), (b) from 5 to 500 parts by weight of a finely divided silica filler, (c) from 0.01 to 5 parts by weight of a dialkyl peroxide or peroxy ketal which has a half-life of 1 hour at a temperature of from 130° C. to 150° C., (d) from 0.1 to 5 parts by weight of a silicon compound having two or more Si—H bonds per molecule, and (e) from 0.01 to 2 parts by weight of an organic peroxide represented by the following general formula (II):

(I)

wherein $R^1$ represents a substituted or unsubstituted monovalent hydrocarbon group; and m represents a positive number of from 1.98 to 2.02;

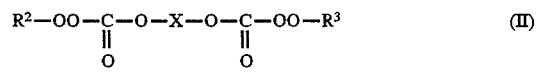

(II)

wherein X represents a $C_{2-8}$ unsubstituted divalent hydrocarbon group; and $R^2$ and $R^3$ may be the same or different and each represent a $C_{3-10}$ monovalent hydrocarbon group or a group represented by —$SIR^4_3$ (in which —$R^4$ represents a methyl, ethyl or phenyl group).

A sealing component for connector waterproofing comprising an oil-bleeding vulcanized composition containing (f) from 1 to 30 parts by weight of a silicon-containing bleed oil, in addition to the foregoing components (a) to (e) can exert a stronger effect.

BRIEF DESCRIPTION OF THE DRAWINGS

By way of example and to make the description more clear, reference is made to the accompanying drawings in which.

DETAILED DESCRIPTION OF THE INVENTION

Figure 1:
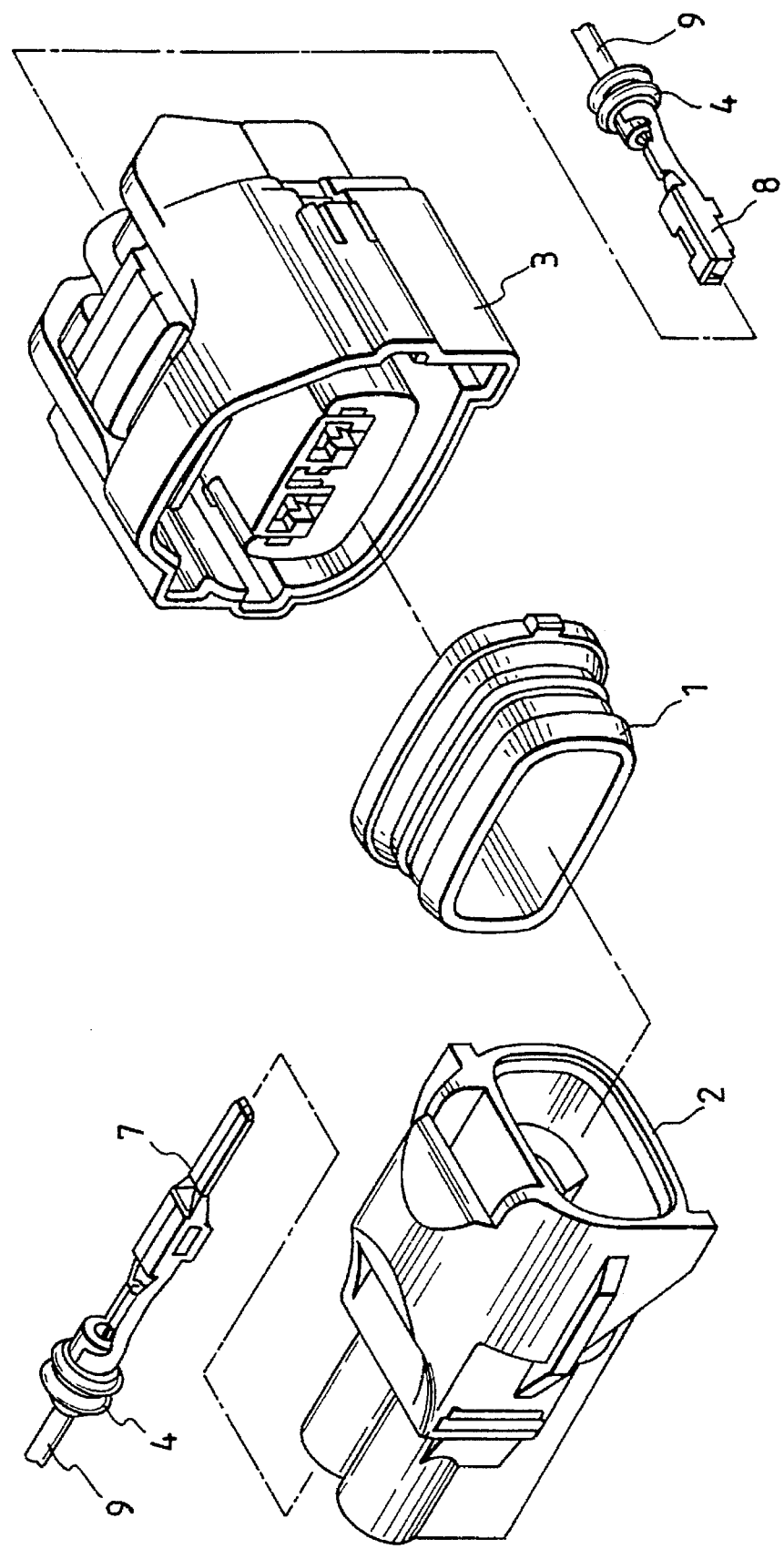
FIG. 1 illustrates how to use an example of the sealing component for connector waterproofing of the present invention.

The organopolysiloxane as the component (a) of the present invention is a straight-chain organopolysiloxane represented by the average composition formula $R^1{}_m SiO_{(4-m)/2}$ (in which m represents a positive number of from 1.98 to 2.02) which is normally referred to as "silicone oil" or "raw silicone rubber" wherein $R^1$ preferably represents an alkyl group such as methyl, ethyl and propyl, a cycloalkyl group, an alkenyl group such as vinyl and allyl, an aryl group such as phenyl and tollyl or a chloromethyl or 3,3,3-trifluoropropyl group obtained by substituting some of hydrogen atoms connected to carbon atoms in these groups with a halogen atom, a cyano group, etc., with the proviso that $R^1$ normally comprises at least 50 mol % of methyl group, from 0 to 5 mol % of vinyl group and from 0 to 50 mol % of phenyl group.

The organopolysiloxane is preferably terminated by a triorganosilyl group such as trimethylsilyl group, dimethylvinylsilyl group, methyldivinylsilyl group and methylphenylvinylsilyl group or a hydroxy group. The organopolysiloxane of the present invention preferably exhibits a viscosity at 25° C. of at least 100,000 cs, more preferably 100,000 cs to 10,000,000 cs, to maintain the desired hardness of the silicone rubber obtained by hardening a composition containing it.

In general formula (I), the group of $R^1$ preferably has a carbon number of 1 to 15, and particularly 1 to 8.

The finely divided silica filler to be used as the component (b) in the present invention preferably exhibits a specific surface area of not less than 50 m²/g, more preferably from 100 to 400 m²/g. Examples of such a silica filler include fumed silica, calcined silica, and precipitated silica. These silica fillers may be used singly or in combination. These silica fillers may be treated with a chain organopolysiloxane, cyclic organopolysiloxane or hexamethyldisilazalane on the surface thereof.

The added amount of the component (b) is preferably from 5 to 500 parts by weight, more preferably from 10 to 50 parts by weight based on 100 parts by weight of the organopolysiloxane as the component (b). If the added amount of the organopolysiloxane exceeds or falls below the above defined range, the resulting silicone rubber composition exhibits a reduced workability. Further, the hardened matter obtained by hardening such a composition leaves something to be desired in mechanical strength, i.e., tensile strength and tear strength.

The dialkyl peroxide or peroxy ketal to be used as the component (c) in the present invention is normally employed in the injection molding or transfer molding of silicone rubber and has a half-life of 1 hour at a temperature of from 130° C. to 150° C. Examples of such a dialkyl peroxide or peroxy ketal include di-t-butylperoxide, 2,5-dimethyl-di-t-butylperoxyhexane, dicumyl peroxide, and 1,1-bis-t-butylperoxy-3,3,5-trimethylcyclohexane. These compounds may be used singly or in combination.

The added amount of the component (c) is preferably from 0.01 to 5 parts by weight based on 100 parts by weight of the organopolysiloxane as the component (a). If the added amount of the component (c) falls below 0.01 parts by weight, sufficient vulcanization cannot be made during the formation of the silicone rubber, occasionally making it impossible to obtain a silicone rubber having desired properties fit for practical use. On the contrary, if the added amount of the component (c) exceeds 5 parts by weight, the residue of the decomposition of the excess organic peroxide has an adverse effect or the excess of the peroxide unnecessarily adds to the cost.

The silicon compound to be used as the component (d) in the present invention has at least two Si—H bonds per molecule. It may have an ordinary straight-chain or cyclic structure. Further, it may contain a small amount of branched structure or three-dimensional structure. Examples of such a silicon compound include an organohydrogenpolysiloxane compound represented by the average composition formula $R^2{}_p SiH_q O_{(4-p-q)/2}$ (in which $R^2$ represents a substituted or unsubstituted monovalent hydrocarbon group, p represents a positive number of from 0 to 3; and q represents a positive number of from 0.005 to 1, with the proviso that the sum of p and q is from 0.8 to 3). The compound preferably has a polymerization degree of not more than 300. Examples of such an organohydrogenpolysiloxane include diorganopolysiloxane terminated by dimethylhydrogensilyl group, copolymer of dimethylsiloxane unit with methylhydrogensiloxane unit and terminal trimethylsiloxy unit, low viscosity fluid consisting of dimethylhydrogensiloxane unit ($H(CH_3)_2SiO_{0.5}$ unit) and $SiO_2$ unit, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

Further, polysilalkylene siloxane, polysilane, and polycarbosilane having Si—H bond may also be used as the component (d). These siloxanes and silanes are organic silicon compounds containing at least one of the following atomic groups per molecule:

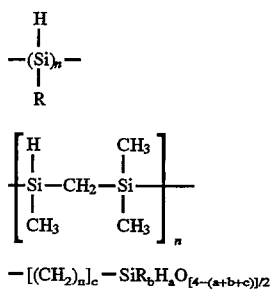

wherein R represents an alkyl group such as methyl, ethyl and propyl, an alkenyl group such as vinyl and allyl, an aryl group such as tollyl or a chloromethyl or 3,3,3-trifluoropropyl group obtained by substituting some of hydrogen atoms connected to carbon atoms in these groups with a halogen atom, a cyano group, etc.; a represents a positive number of from 0.1 to 1.2; b represents a positive number of from 1 to 2; c represents a positive number of from 0.01 to 1.0; and n represents an integer of from 1 to 10, with the proviso that the sum of a and b is from 1.8 to 3.0.

In the present invention, a polysilalkylene siloxane, polysilane, polycarbosilane and mixture thereof are preferably used as the component (d).

Specific examples of the silicon compound to be used as the component (d) include the following compounds:

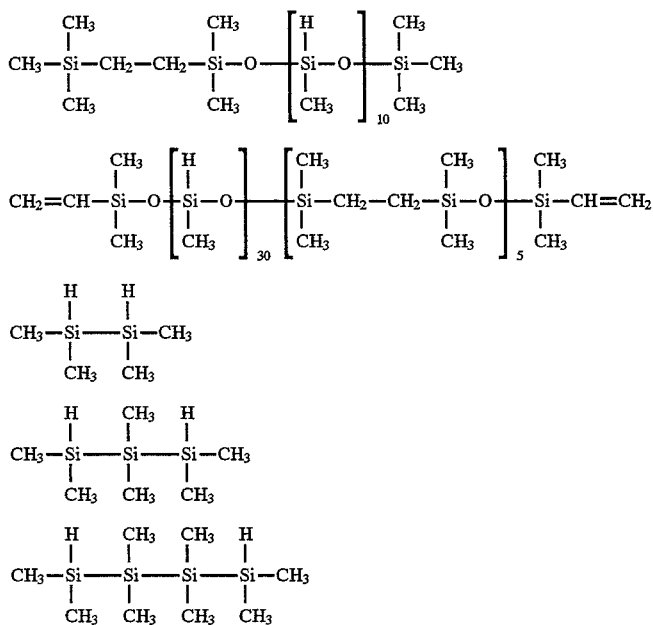

The component (d) remarkably accelerates the curing rate at which the vulcanized composition of the present invention is cured under heating. The added amount of the component (d) is preferably from 0.1 to 5 parts by weight, particularly from 0.1 to 2 parts by weight based on 100 parts by weight of the organopolysiloxane as the component (a). If the added amount of the component (d) falls below 0.1 parts by weight, the resulting effect is not so sufficient as desired. On the contrary, if the added amount of the component (d) exceeds 5 parts by weight, the various properties of the sealing component for connector waterproofing obtained from the composition of the present invention can be deteriorated.

The organic peroxide to be used as the component (e) in the present invention is a compound represented by the following general formula (II):

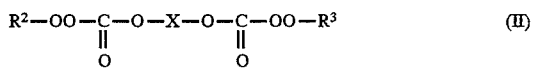

wherein X represents a $C_{2-8}$ unsubstituted divalent hydrocarbon group, particularly a group represented by —$(CH_2)_p$— (in which p represents an integer of from 2 to 8) or —$CH_2$—$C(CH_3)_2$—$CH_2$—; and $R^2$ and $R^3$ may be the same or different and each represent a $C_{3-10}$ monovalent hydrocarbon group such as n-propyl group, iso-propyl group, t-butyl group, n-butyl group, n-amyl group, t-amyl group, hexyl group, heptyl group, octyl group, 2-ethylpropyl group, 2-ethylbutyl group, 2-ethylhexyl group and cumyl group or trimethylsilyl, triethylsilyl or triphenylsilyl group represented by —$Si(R^4)_3$ (in which $R^4$ represents a methyl group, ethyl group or phenyl group).

The organic peroxide to be used as the component (e) accelerates the heat curing of the vulcanized composition of the present invention to facilitate the release of the molded product from the mold. The added amount of the organic peroxide is preferably from 0.01 to 2 parts by weight, particularly from 0.01 to 0.5 part by weight based on 100 parts by weight of the organopolysiloxane as the component (a). If the added amount of the organic peroxide falls below 0.01 parts by weight, the resulting effect is not so sufficient as desired. On the contrary, if the added amount of the organic peroxide exceeds 2 parts by weight, the residue of the decomposition of the excess organic peroxide has an adverse effect or scorching can occur when the composition is heat-cured.

As the silicon-containing bleed oil to be used as the component (f) in the present invention there may be used an oil containing one or more silicon atoms commonly incorporated in oil-bleeding silicone rubbers as it is. Such a bleed oil preferably exhibits a viscosity of from 50 to 20,000 cp at 25° C. and contains 3 or more silicon atoms accompanying siloxane bond. The organic groups connected to the silicon atom in the silicon-containing bleed oil preferably comprise an aryl group such as phenyl group and tollyl group or a group represented by $R^5$—(—O—$R^6$—)$_q$— (in which $R^5$ represents a hydrogen atom or $C_{1-8}$ monovalent hydrocarbon group, $R^6$ represents a $C_{2-8}$ divalent hydrocarbon group, and q represents an integer of from 1 to 10) in a proportion of from 1 to 50%, more preferably a phenyl group in a proportion of from 10 to 50%.

The added amount of the component (f) is preferably from 1 to 30 parts by weight based on 100 parts by weight of the organopolysiloxane as the component (a). If the added amount of the component (f) falls below 1 parts by weight, the desired oil bleeding cannot be possibly obtained. On the contrary, if the added amount of the component (f) exceeds 30 parts by weight, the resulting rubber exhibits a reduced mechanical strength or it is made difficult to maintain the desired rubber hardness. Further, the oil can bleed out on the surface of the unvulcanized rubber composition, causing malfusion in the molded product or vigorous stain on the mold during vulcanization and molding.

The sealing component for connector waterproofing of the present invention can be obtained by a process which comprises mixing the foregoing components, kneading the mixture, injecting the mixture into a mold, and then heating the mixture so that it is vulcanized and molded. The kneading of the mixture can be effected by means of a known rubber composition kneader such as roll mill, kneader and Banbury mixer. The vulcanization and molding of the mixture can be effected by means of a known rubber vulcanizing and molding machine such as injection molding machine and transfer molding machine.

The preparation of the sealing component for connector waterproofing of the present invention requires a drastically reduced vulcanization and molding time. A silicone bleed oil having a poor compatibility with the base rubber, if used, can gradually bleed out after vulcanization and molding to enhance the sealing properties of the rubber with respect to the connector housing.

The present invention will be further described in the following example, but the present invention should not be construed as being limited thereto.

EXAMPLE

Materials A to G set forth in Table 1 were kneaded by means of a kneader mixer and a two-roll mill to obtain rubber compositions 1 to 11 having formulations set forth in Table 2.

TABLE 1

Material A (component a): methyl vinyl polysiloxane having an average polymerization degree of 3,000 consisting of 99.825 mol % of $(CH_3)_2SiO$ unit, 0.15 mol % of $(CH_3)(CH_2=CH)SiO$ unit and 0.025 mol % of $(CH_2=CH)(CH_3)_2SiO_{1/2}$ unit Material B (component b): fumed silica having a specific surface area of 200 m²/g (Aerosil 200, available from Nihon Aerosil Co., Ltd.)

Material C: diphenylsilanediol

Material D (component f): phenyl-containing diorganopolysiloxane represented by the average molecular formula $(CH_3)_3SiO[SiPh_2O]_m[Si(CH_3)_2O]_nSi(CH_3)_3$ (in which m represents an integer of 4, and n represents an integer of 12)

Material E (component c): 2,5-dimethyl-2,5-di(t-butylperoxy)hexane

Material F (component d): polysilalkylenesiloxane represented by the following average molecular formula:

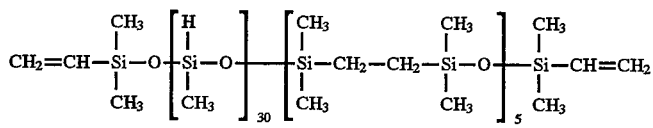

Material G (component e): organic peroxide represented by the following average molecular formula:

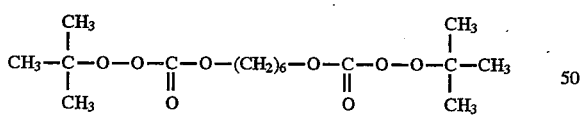

These rubber compositions were then allowed to stand at a temperature of 30° C. for 5 days and for 30 days. These rubber compositions were each then measured for the time required until vulcanization begins at a temperature of 170° C. ($T_{10}$: time required until the torque reaches 10% of the final torque) by means of an oscillating disc rheometer available from Toyo Seiki Kogyo K.K. After examined for storage stability, these rubber compositions were each subjected to transfer molding at a mold temperature of 170° C. for a vulcanizing time of 2 minutes or an optimum vulcanizing time to form a rubber packing 1 having a shape shown in FIG. 1 which was then examined for moldability and percent occurrence of malmolding. For the evaluation of moldability, G (good) indicates a good moldability and P (poor) indicates the occurrence of an insufficient packing in Table 2.

These rubber packings thus obtained were each mounted on a female housing 2 for resin waterproofing connector with a rubber stopper 4 having a shape shown in FIG. 1 which had been previously molded from a different material, and then fitted into a male housing 3. The force (kgf) required to fit these components was measured by means of a compression stress meter (Autograph, available from Shimadzu Corp.).

Figure 2:
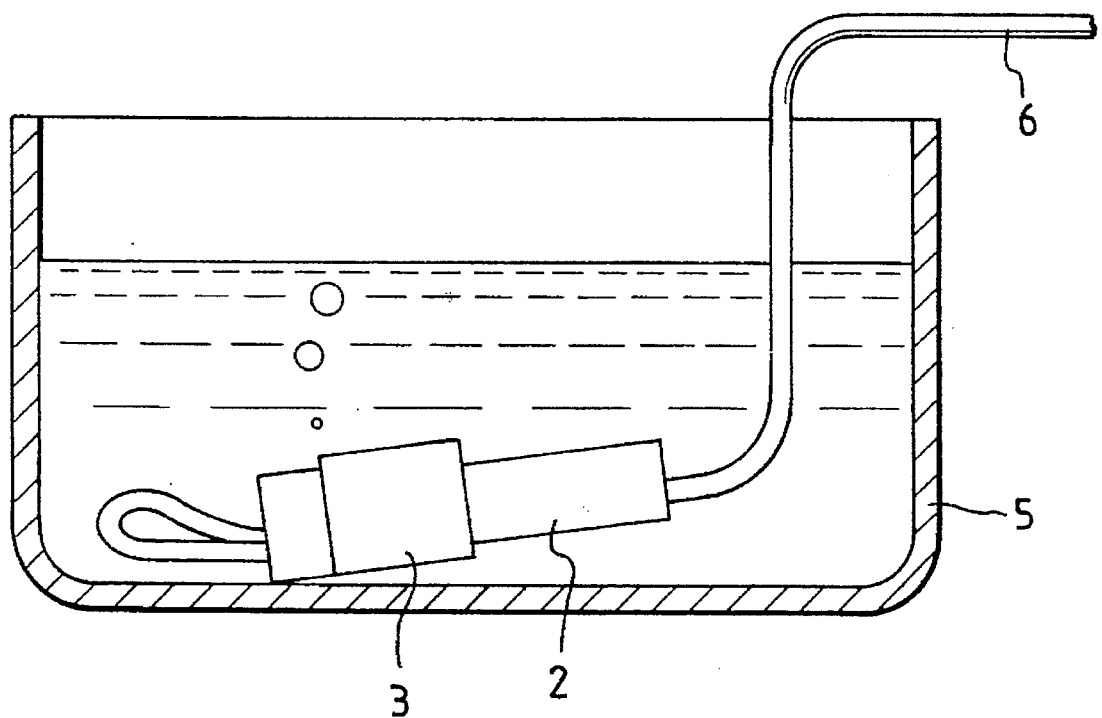
FIG. 2 illustrates how to examine the sealing properties of the sealing component for connector waterproofing, wherein the reference numeral 1 indicates a rubber packing, the reference numeral 2 indicates a female housing, the reference numeral 3 indicates a male housing, the reference numeral 4 indicates a rubber stopper, the reference numeral 5 indicates a water bath, the reference numeral 6 indicates an air tube, the reference numeral 7 indicates a male metallic terminal, the reference numeral 8 indicates a female metallic terminal, and the reference numeral 9 indicates an electric wire.

Air tube 6 was attached to a portion of the waterproofing connector housing on which the rubber stopper had been mounted. As shown in FIG. 2, the test sample was then immersed in a water bath 5 to a depth of about 10 cm. Air was then pumped into the connector housing through the air tube 6 until the pressure therein reached 9.8 kPa. The test sample was then examined for air leak over 30 seconds. If no air leak was observed, air was further pumped into the connector housing to raise the pressure by 9.8 kPa, and the pressure thus raised was then kept over 30 seconds to examine air leak. This procedure was repeated until the pressure reached 59 kPa. For the evaluation of initial waterproofness, G (good) indicates no air leak and P (poor) indicates the occurrence of air leak in Table 2.

On the other hand, the waterproofing connector housing thus assembled was aged at a temperature of 120° C. for 1,000 hours. For the evaluation of waterproofness with time, the test sample was examined in the same manner as above.

The results of these evaluation tests are set forth in Table 2.

TABLE 2

| Sample No. | 1 | 2 | 3 | 4 | 5* | 6* | 7* | 8* | 9* | 10* | 11* |
|---|---|---|---|---|---|---|---|---|---|---|---|
| Material | | | | | | | | | | | |
| A: component a | 100 | 100 | 100 | 100 | 100 | 100 | 100 | 100 | 100 | 100 | 100 |
| B: component b | 30 | 30 | 30 | 30 | 30 | 30 | 30 | 30 | 30 | 30 | 30 |
| C | 4 | 4 | 4 | 4 | 4 | 4 | 4 | 4 | 4 | 4 | 4 |
| D: component f | — | — | — | 6 | — | — | — | — | — | — | — |
| E: component c | 0.5 | 0.5 | 0.5 | 0.5 | 0.5 | 0.005 | 6.0 | 0.5 | 0.5 | 0.5 | 0.5 |
| F: component d | 0.2 | 0.2 | 1.0 | 0.2 | — | 0.2 | 0.2 | — | 6.0 | 0.2 | 0.2 |
| G: component e | 0.02 | 0.1 | 0.02 | 0.02 | — | 0.02 | 0.02 | 0.02 | 0.02 | — | 3.0 |
| Results of evaluation of properties After 5 day ageing | | | | | | | | | | | |
| $T_{10}$ (sec) | 46 | 40 | 44 | 48 | 113 | 170 | 36 | 102 | 45 | 96 | 19 |
| Moldability | G | G | G | G | G | G | P | G | P | G | P |
| % Defective | 0.60 | 0.82 | 0.76 | 0.70 | 1.10 | 20.38 | 10.55 | 1.08 | 7.50 | 1.58 | 25.75 |
| Vulcanizing time (min.) | 2 | 2 | 2 | 2 | 7 | 10 | 2 | 7 | 2 | 7 | 2 |
| Fitting force (kgf) | 2.24 | 2.12 | 2.31 | 2.01 | 2.37 | 2.39 | 2.34 | 2.22 | 1.95 | 2.26 | 2.11 |
| Initial waterproofness | G | G | G | G | G | P | G | G | P | G | P |
| Waterproofness with time | G | G | G | G | G | P | P | G | P | G | P |
| Results of evaluation of properties After 30 day ageing | | | | | | | | | | | |
| $T_{10}$ (sec) | 45 | 40 | 45 | 47 | 119 | 178 | 33 | 98 | 46 | 98 | 17 |
| Moldability | G | G | G | G | G | G | P | G | P | G | P |
| % Defective | 0.68 | 0.85 | 0.64 | 0.61 | 0.98 | 17.41 | 15.24 | 1.00 | 5.00 | 1.86 | 27.5 |
| Vulcanizing time (min.) | 2 | 2 | 2 | 2 | 7 | 10 | 2 | 7 | 2 | 7 | 2 |
| Fitting force (kgf) | 2.30 | 2.08 | 2.20 | 1.88 | 2.26 | 2.50 | 2.40 | 2.23 | 2.11 | 2.32 | 2.04 |
| Initial waterproofness | G | G | G | G | G | P | G | G | P | G | P |
| Waterproofness with time | G | G | G | G | G | P | P | G | P | G | P |

*: comparative example

As mentioned above, the sealing component for connector waterproofing of the present invention comprises a rubber composition having a special formulation which exhibits an excellent storage stability and requires a short vulcanizing time and thus is insusceptible to quality variation due to malmolding and exhibits excellent waterproofness, surface wettability and water repellency. Further, the sealing component for connector waterproofing can be produced at a reduced manufacturing cost.

While the invention has been described in detail and with reference to specific embodiments thereof, it will be apparent to one skilled in the art that various changes and modifications can be made therein without departing from the spirit and scope thereof.

What is claimed is:

1. A sealing component for connector waterproofing, which comprises a vulcanized composition comprising at least (a) 100 parts by weight of an organopolysiloxane represented by the following average composition formula (I), (b) from 5 to 500 parts by weight of a finely divided silica filler, (c) from 0.01 to 5 parts by weight of a dialkyl peroxide or peroxy ketal which has a half-life of 1 hour at a temperature of from 130° C. to 150° C., (d) from 0.1 to 5 parts by weight of a silicon compound having two or more Si—H bonds per molecule, and (e) from 0.01 to 2 parts by weight of an organic peroxide represented by the following general formula (II):

$$R^1_m SiO_{(4-m)/2} \quad (I)$$

wherein $R^1$ represents a substituted or unsubstituted monovalent hydrocarbon group; and m represents a positive number of from 1.98 to 2.02;

$$R^2-OO-\underset{\underset{O}{\|}}{C}-O-X-O-\underset{\underset{O}{\|}}{C}-OO-R^3 \quad (II)$$

wherein X represents a $C_{2-8}$ unsubstituted divalent hydrocarbon group; and $R^2$ and $R^3$ may be the same or different and each represent a $C_{3-10}$ monovalent hydrocarbon group or a group represented by —$SiR^4_3$ in which $R^4$ represents a methyl, ethyl or phenyl group.

2. The sealing component for connector waterproofing according to claim 1, wherein said silicon compound as the component (d) is a polysilalkylene siloxane, polysilane, polycarbosilane or mixture thereof.

3. The sealing component for connector waterproofing according to claim 1, wherein said vulcanized composition further comprises (f) from 1 to 30 parts by weight of a silicon-containing bleed oil.

4. The sealing component for connector waterproofing according to claim 2, wherein said vulcanized composition further comprises (f) from 1 to 30 parts by weight of a silicon-containing bleed oil.

5. The sealing component for connector waterproofing according to claim 1, wherein the finely divided silica filler (b) has a specific surface area of not less than 50 m²/g and is selected from the group consisting of fumed silica, calcined silica and precipitated silica.

6. The sealing component for connector waterproofing according to claim 1, wherein the component (c) is selected from the group consisting of di-t-butylperoxide, 2,5-dimethyl-di-t-butylperoxyhexane, dicumyl peroxide, and 1,1-bis-t-butylperoxy-3,3,5-trimethylcylcohexane.

7. The sealing component for connector waterproofing according to claim 3, wherein said bleed oil has a viscosity of from 50 to 20,000 cp at 25° C. and contains 3 or more silicon atoms accompanying siloxane bond.

8. The sealing component for connector waterproofing according to claim 1, wherein said organopolysiloxane as the component (a) has a viscosity of at least 100,000 cs at 25° C.

* * * * *